C. RYAN.
NUT LOCK.
APPLICATION FILED JUNE 29, 1912.

1,061,871.

Patented May 13, 1913.

Witnesses:
Theo. Lagaard
H. A. Bowman.

Inventor:
Catharine Ryan
By F. A. Whiteley
her Attorney

UNITED STATES PATENT OFFICE.

CATHARINE RYAN, OF ST. PAUL, MINNESOTA.

NUT-LOCK.

1,061,871.  Specification of Letters Patent.  Patented May 13, 1913.

Application filed June 29, 1912. Serial No. 706,605.

*To all whom it may concern:*

Be it known that I, CATHARINE RYAN, a citizen of the United States, residing at St. Paul, in the county of Ramsey and State of Minnesota, have invented certain new and useful Improvements in Nut-Locks, of which the following is a specification.

My invention relates to a nut lock and has for its object to provide a bolt with a peculiar system of threading in combination with a nut having a corresponding and coöperative system of threading such that when the nut is secured upon the bolt it will tend to move, if at all, in toward the unthreaded portion of the bolt.

The full objects and advantages of my invention will appear in connection with the detailed description thereof and are particularly pointed out in the claims.

Figure 3:
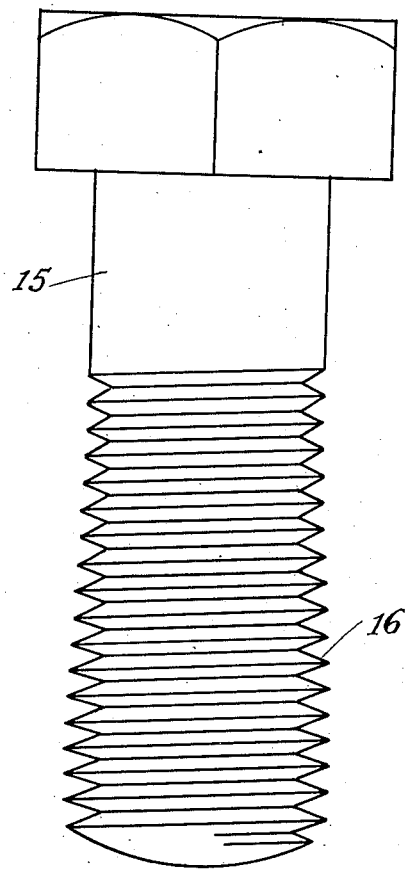
Figure 1:
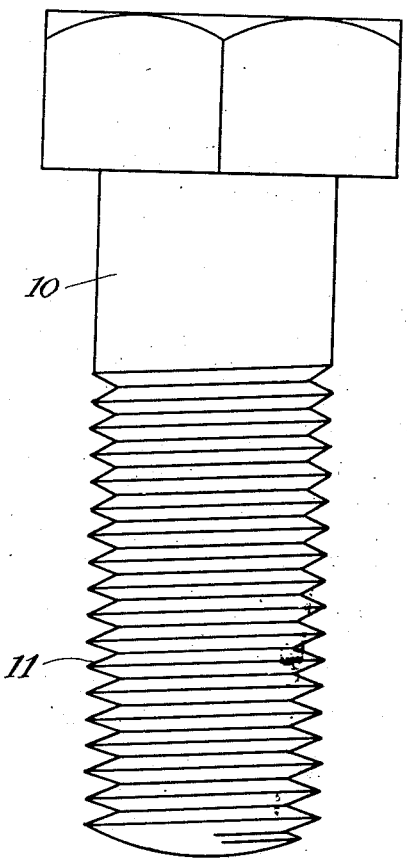
Figure 2:
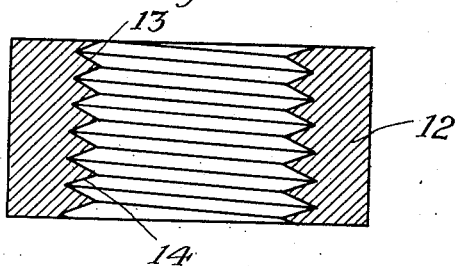

In the drawings, illustrating the application of my invention in one form, Figure 1 is a view of a bolt and Fig. 2 a sectional view of a nut embodying my invention. Fig. 3 is a modified form of a bolt adapted to be used with the nut shown.

As shown in Fig. 1, the bolt 10 is provided with a thread 11 which is deepest at the free end of the bolt but gradually diminishes in depth toward the unthreaded portion of the bolt. The tops of the threads lie in a cylindrical surface parallel with the side walls of the bolt or concentric with the axis of the bolt.

The nut 12, as shown in Fig. 2, is provided with an interior thread which beginning with the thread 13 at one side of the nut is about equal in depth to the threads on the bolt 10 adjacent the unthreaded portion of the bolt, said nut threads gradually increased in depth to a point 14 at the other side of the nut where the threads will approximate in depth the deeper threads 11 on bolt 10. The bottoms of the threads of nut 12 will lie in a common cylindrical surface concentric with the central axis of the nut. When the nut 12 is applied to the bolt 10 the threads 13 will be first placed over the deepest threads 11 at the end of bolt 10 and the nut will go onto the bolt with comparative ease. As the deeper threads 14 of the nut 12 pass onto the deepest threads 11 of the bolt they will bind and wedge and hold the nut locked in position.

In Fig. 3 is shown a bolt 15 having threads 16 constantly diminishing in depth from the end of the bolt to the unthreaded portion of the bolt, the bottoms of said threads falling in a cylindrical surface concentric with the axis of the bolt. In this case the tops of the threads do not extend in parallel lines. This bolt is used with a nut 12 and has a still more powerful locking effect. In practice the threads 14 will be so related in size to the largest of the threads 16 or bolt 15 that the nut can with difficulty be driven over such largest threads and will turn with increasing ease after passing said highest threads so as to tend constantly to turn toward the unthreaded portion of the bolt and be held locked in position on the bolt.

My nut and bolt can be manufactured cheaply, and in use will prove very efficient especially for securing the tie-bars and fish-plate of railroad rails in position.

I claim:

1. A bolt comprising a threaded portion having the threads thereof constantly diminishing in depth from the end to the unthreaded portion, in combination with a nut having the threads thereof constantly increasing in depth from the side of application of the nut to the bolt to the other side of the nut.

2. A bolt having the threaded portion thereof formed with a series of threads constantly diminishing in depth from the end of the threaded bolt to the unthreaded portion thereof. the bases of said threads falling in a cylindrical surface concentric with the axis of the bolt, in combination with a nut having the threads thereof constantly increasing in depth from the side of application of the nut to the bolt to the other side of the nut.

In testimony whereof I affix my signature in the presence of two witnesses.

CATHARINE RYAN.

Witnesses:
F. A. WHITELEY,
H. A. BOWMAN.